(No Model.)

R. P. FRIST.
TUBE OF PARCHMENTIZED FIBER AND APPARATUS FOR MAKING THE SAME.

No. 467,248. Patented Jan. 19, 1892.

Witnesses
Sidney Hollingsworth
T. Washington Miller

Inventor
Robert P. Frist
by Baldwin Davidson & Wright
Attorneys

UNITED STATES PATENT OFFICE.

ROBERT PORTER FRIST, OF WILMINGTON, DELAWARE, ASSIGNOR TO THE DELAWARE HARD FIBER COMPANY, OF SAME PLACE.

TUBE OF PARCHMENTIZED FIBER AND APPARATUS FOR MAKING THE SAME.

SPECIFICATION forming part of Letters Patent No. 467,248, dated January 19, 1892.

Application filed July 20, 1891. Serial No. 400,153. (No model.)

*To all whom it may concern:*

Be it known that I, ROBERT PORTER FRIST, a citizen of the United States, residing at Wilmington, in the county of New Castle and State of Delaware, have invented certain new and useful Improvements in the Manufacture of Tubes of Parchmentized Fiber and in Apparatus for Making the Same, of which the following is a specification.

Prior to my invention, so far as my knowledge extends, the only known mode of making tubes of parchmentized fiber consisted in winding a sheet of fiber the width of which was equal to the length of the tube desired upon a rod or mandrel in successive layers caused to adhere by the pressure of the feed-rolls. This method was capable of producing good results only when producing comparatively short tubes of comparatively large diameter, as the length of the tube was necessarily limited by the width of the sheet and the strain upon the mandrel was so great as to cause it to spring or yield laterally when making small tubes, neither the roll nor the mandrel being able to resist the lateral pull of the fabric. The parchmentized fiber from which these tubes are manufactured generally consists of paper subjected to the action of a transforming agent, bath, or fluid, such as sulphuric or nitric acid, the chlorides of zinc, &c. The nature and objects of these transforming agents are well known to those skilled in the art, being specified, for instance, in Schmidt's United States patents, No. 61,267, of January 15, 1867, and No. 113,454, April 4, 1871.

My invention contemplates the use of any suitable known transforming agent, and consists, essentially, in a novel method of forming the tubes.

My invention has for its object the manufacture of tubes of parchmentized fiber of almost any desired diameter and length, which ends I attain by winding strips of the fiber moistened with the transforming agent spirally one layer upon the other and subjecting them to pressure, whereby the abutting edges of each strip and the adjacent surfaces of the superimposed layers are caused to adhere and form a comparatively rigid tube with close joints.

The subject-matter claimed is hereinafter specified.

Figure 1:
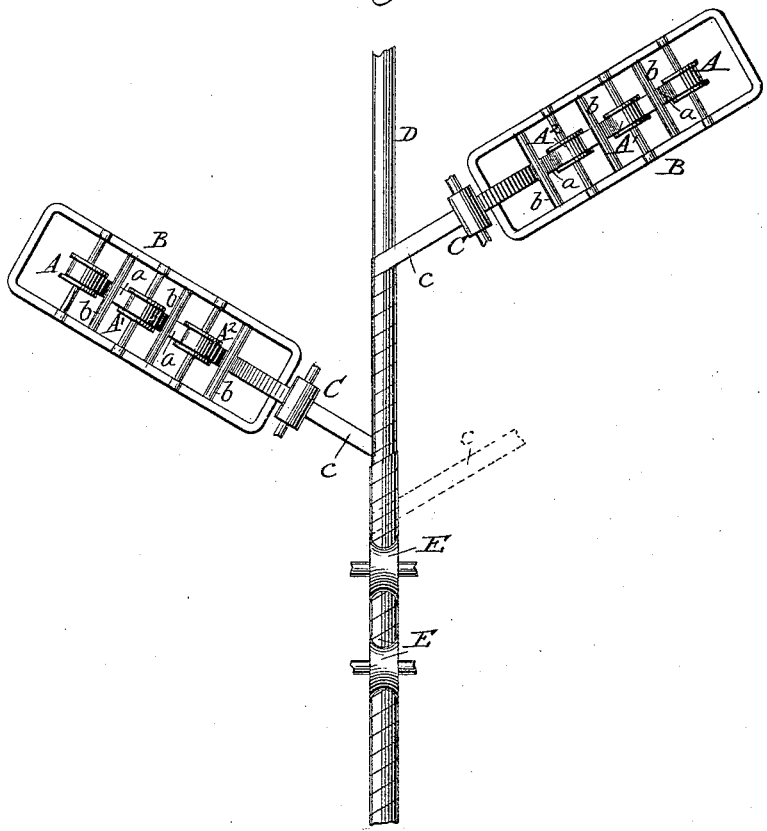
Figure 2:
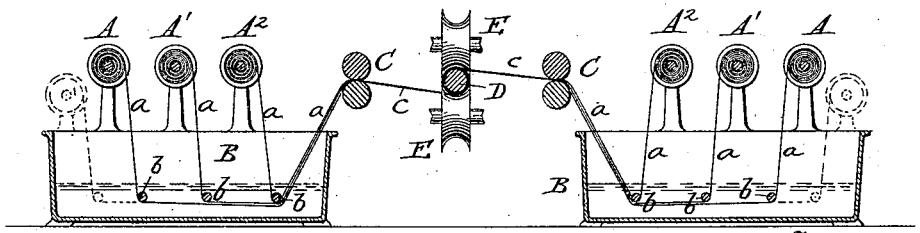

The accompanying drawings show so much only of apparatus adapted for carrying out my invention as is necessary to illustrate the subject-matter claimed, Figure 1 being a plan and Fig. 2 a vertical transverse section therethrough.

The apparatus for forming the strips being shown in duplicate, a description of one set will be sufficient. Unless otherwise indicated the parts are of usual well-known construction. The apparatus is also shown as adapted for the formation of a strip consisting of several layers or thicknesses of paper superimposed one upon the other before being formed into a tube.

Each paper roll A A' A$^2$ is mounted so as to turn freely in bearings over a vat or tank B, containing the transforming-fluid. Each strip $a$ passes under a suitable roller $b$ beneath the fluid in the tank, so arranged that the strips pass from the tank lying one over the other, and, being still moistened with the transforming-fluid, are consolidated by passing between the pressure-rolls C. The consolidated strip $c$ is then wound around a mandrel D, of suitable diameter and length, rotated by well-known means, in such manner that the edges of the strip abut closely. While still moist with the transforming-fluid and while still on the mandrel these spirals are traversed by pressure-rolls E on opposite sides of the mandrel, curved to conform to the shape thereof or to the tube to be formed, thereby uniting the abutting edges of the strip and causing them to adhere together. Any desired number of strips may be thus wound one over the other, in which case the pressure-rolls not only cause the adhesion of the abutting edges of the strip but of the abutting surfaces of the superimposed strips.

The drawings show the apparatus as organized for the superposition of two strips one upon the other. The organization is also such, it will be observed, that both strips are wound in the same direction—that is, with their spirals parallel and breaking joints—that is, one strip overlaps the joint of the other, thus stiffening the tube and increasing the tightness of its joints.

The strips might be wound in reverse order—that is, with their spirals crossing at an angle or diagonally—but this plan does not produce such good results as the parallel overlapping winding, as the cross-winding tends to leave holes at the intersections of the strips.

Application Serial No. 350,551, filed by me May 5, 1890, shows, describes, and claims a method of making parchmentized-fiber tubes by spirally and successively winding strips of the moistened fiber upon a mandrel and upon each other and consolidating the layers by pressure. I have also claimed in said application as a new article of manufacture a parchmentized-fiber tube composed of strips wound spirally, with their abutting edges consolidated and cemented together, so as to form a continuous fabric. I of course do not claim in this application anything therein set forth.

My present apparatus, it will be seen, enables me simultaneously to wind a series of strips spirally one upon the other and also to increase the thickness of each strip to any extent desired by consolidating superimposed strips after they are subjected to the action of the chemical bath or transforming-fluid, and before they are wound into a tube.

In operation as many strips as desired are conducted through the bath, superposed one upon the other, and pass between the consolidating-rolls, which condense all the strips passing between them into one, each strip being then wound upon the mandrel and consolidated by the pressure-rolls. The drawings show two sets of baths and consolidating-rolls, one on each side of the mandrel; but both sets of apparatus might be on the same side of the mandrel, or the number may be increased, so as simultaneously to wind additional layers, as will readily be understood from the foregoing description. The superposed strips are preferably kept separate until consolidated by the consolidating-rolls.

Having thus fully described my improvements, what I claim therein as new and as of my own invention is—

1. The herein-described method of making tubes of parchmentized fiber, which consists in winding spirally around a mandrel a strip of parchmentized fiber while in a moist condition and simultaneously winding spirally around the mandrel and over the first-mentioned strip a second moist strip and consolidating the edges of the strips by pressure.

2. The herein-described method of making tubes of parchmentized fiber, which consists in passing separate strips of paper through a transforming-bath and consolidating them by pressure, winding the consolidated strip spirally around a mandrel to form a tube, and cementing or consolidating the edges of the consolidated strip by pressure.

3. The combination, substantially as hereinbefore set forth, of a transforming-bath, means for passing strips of paper separately through the bath, means for consolidating these strips into a single strip, a rotating mandrel upon which the consolidated strip is wound spirally, and means for consolidating and cementing the adjacent edges of the consolidated strip.

4. The combination, substantially as hereinbefore set forth, of a transforming-bath, means for passing separate strips of paper therethrough, rollers for consolidating these strips, a rotating mandrel upon which the consolidated strip is wound spirally with closely adjacent edges, and pressure-rollers traversing the consolidated strip to consolidate and cement its adjacent edges.

5. The combination, substantially as hereinbefore set forth, of a rotating mandrel, a transforming-bath, rollers submerged in the bath for guiding strips of paper therethrough, consolidating-rollers between which the strips pass, and grooved pressure-rollers traversing the mandrel longitudinally, for the purpose specified.

6. The combination, substantially as hereinbefore set forth, of separate transforming-baths, paper-rollers supported over them, rollers in the baths, under which strips of papers pass and by which they are superposed one above the other, consolidating-rollers between which these superposed strips pass after leaving the bath, a rotating mandrel upon which the separate consolidated strips are simultaneously wound spirally one upon the other, and pressure-rollers traversing the mandrel to consolidate and cement the strips as they are wound thereon.

In testimony whereof I have hereunto subscribed my name.

ROBERT PORTER FRIST.

Witnesses:
THOMAS GIFFIN,
HERMANN E. FRIST.